Patented Feb. 11, 1936

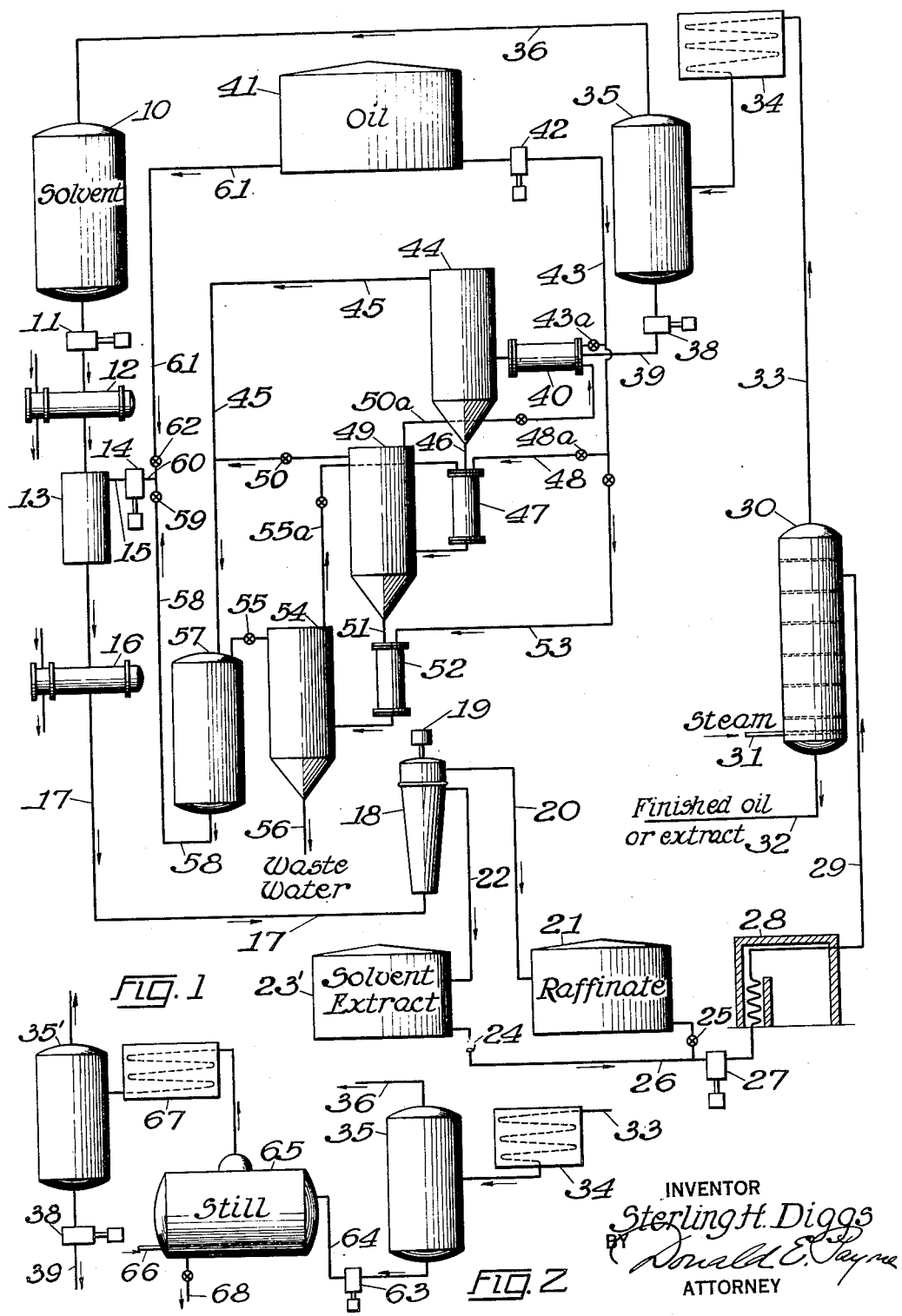

2,030,284

UNITED STATES PATENT OFFICE 2,030,284

SOLVENT RECOVERY IN OIL EXTRACTION PROCESSES

Sterling H. Diggs, Casper, Wyo., assignor to Standard Oil Company, Chicago, Ill., a corporation of Indiana Application February 23, 1933, Serial No. 658,037

8 Claims. (Cl. 196—13)

This invention relates to solvent recovery in oil refining processes wherein a solvent is employed for separating paraffinic from naphthenic components of hydrocarbon oils.

In solvent extraction processes wherein oil is split into raffinate and extract fractions it is necessary to recover the solvent from both the raffinate and the extract. To remove the last traces of solvent it is necessary either to use extremely high temperatures or to use a stripping medium such as steam. High temperatures are objectionable because they have a deleterious effect on the oil and they lead to decomposition of the solvent. When oil is stripped free of solvent with steam, the condensed stripping steam carries with it a certain amount of the solvent. An object of this invention is the recovery of the solvent in those extraction processes, using a solvent of appreciable solubility in water as well as in oil. If the solvent is ββ' dichlorethyl ether, the amount may be about 1% of the volume of condensed steam. If the solvent is aniline or cresol it may be dissolved to the extent of two or three percent. If the solvent is phenol or furfural the solubility may be as high as six or eight percent. Some solvents, such as nitrobenzene, dichlorethylene, etc., are relatively insoluble in water, but even these solvents are carried away to some extent by condensed stripping steam. The object of my invention is to provide a means for recovering the solvent which is dissolved in condensed stripping steam, particularly when that solvent is dichlorethyl ether.

A further object is to reduce the cost of solvent extraction processes, and more particularly to reduce the solvent losses and the expense of solvent recovery systems. A further object is to utilize the oil which is to be extracted for recovering solvent from condensed stripping steam. Other objects will be apparent as the detailed description of the invention proceeds.

In practicing my invention I distil the solvent from the raffinate or extract at a relatively low temperature and remove the final traces of solvent by means of stripping steam. I condense this steam and separate it from solvent vapors which are thereafter condensed and returned to the system. I remove the solvent from the condensed steam by extraction with incoming oil to be treated. I prefer to effect this extraction in a continuous countercurrent manner or, when that is not commercially feasible, by a series of batch separators in which the condensed steam is mixed with fresh oil separated and reextracted with additional amounts of fresh oil. It is desirable to use a large amount of oil relative to the amount of condensed stripping steam, and I may distil the condensed steam and concentrate the solvent in the distillate, thereby decreasing the amount of water from which the solvent must be extracted by incoming oil.

The invention will be more clearly understood from the following detailed description and from the accompanying drawing which forms a part of this specification and in which—

Figure 1 is a diagrammatic elevational plan of my improved solvent extraction system, and Figure 2 is a diagrammatic plan of a slight modification adapted to be employed in the system of Figure 1.

As above stated, the invention is applicable to the recovery of any solvents from condensed stripping steam, and particularly to the recovery of dichlorethyl ether. When this solvent is distilled from oil at a temperature of 350° F. the amount of hydrochloric acid produced is twice as much as the amount produced at a distillation temperature of 300° F. Hydrochloric acid not only tends to cause corrosion, but it forms ferric chloride which acts as a catalyst to produce polymerization and coking so that in addition to the loss of solvent by decomposition, the use of high temperatures may be responsible for unduly high corrosion losses, and much trouble due to plugging of lines or valves with coke. To remove all chlorex from the oil at 300° F. requires large amounts of steam, and the condensed steam may carry in solution about 1% by volume of the dichlorethyl ether. This reagent is relatively expensive and, in fact, the solvent losses in such processes are often the deciding factor in determining whether or not the process is commercially feasible. I will describe my invention as applied to the recovery of dichlorethyl ether from condensed stripping steam.

The oil which is being refined may be a mid-continent distillate having a Saybolt viscosity at 210° F. of about 60 to 120 seconds (S. A. E. 20 to S. A. E. 60). The invention, however, is equally applicable to the extraction of any other oil, wax, tarry matter, etc., such as products formed by the destructive distillation of wood, coal and the like. The oil may contain wax or it may have been dewaxed before extraction.

About two volumes of dichlorethyl ether from storage tank 10 may be forced by pump 11 through heater 12 to mixer 13, where it is intimately mixed with about one volume of the oil which may be an S. A. E. 20 mid-continent distillate stock which has been treated with about one-half pound of 98% sulfuric acid and which has been either neutralized with ammonia or merely separated from the sludge. The invention is equally applicable to untreated stocks or to stocks which have been treated by another solvent or extracted from asphaltic materials by the use of ethane propane, butane, etc. The oil may be introduced by pump 14 in pipe 15 from one of two sources, which will be hereinafter described.

The oil and solvent may suitably be brought into solution at a temperature of about 140–160° F. To effect phase separation, this mixture must be cooled, preferably to about 40° or 60° F., for maximum yields of paraffinic oil. The separation may be effected at temperatures of 100° or higher to obtain raffinates of better temperature viscosity coefficients or a plurality of separations may be made at decreasing temperatures. In any case, however, it will be necessary to cool the oil solvent mixture to a temperature at which phase separation will take place, and I therefore pass the mixture through cooler 16, which may be of the Carbondale chiller type which is provided with scrapers and agitating means to keep the chilled oil in fluent condition in the presence of wax. If the oil has been dewaxed prior to extraction, such scrapers are, of course, unnecessary.

The chilled oil is then passed by pipe 17 to centrifuge 18, which is driven by a motor 19. The raffinate is discharged from the centrifuge through pipe 20 to storage tank 21, and the extract is discharged through pipe 22 to storage tank 23. It should be understood, of course that phase separation may be effected by gravity settling or by any other suitable means, a centrifuge being merely shown by way of example. When there is an intermediate layer or "rag" between the phases, the major part of the separation may be by decantation, and only the "rag" or intermediate layer need be centrifuged.

By closing valve 24 and opening valve 25 the raffinate may be forced through line 26 by pump 27 to pipe still 28, wherein the raffinate may be heated to a temperature of about 300–325° F. The hot mixture is then introduced through pipe 29 to the upper part of stripping column 30, steam being introduced at the base of the column through pipe 31 at a temperature of about 300° F. Column 30 may be provided with any suitable gas liquid contact means, such as bubble plates or baffles, and if desired, a fractionating column may be placed above the stripping column, particularly when another liquid is used with the oil and when it is desirable to separate more than two components. The finished oil is withdrawn from the base of the stripping column through pipe 32, and the solvent from the top of the stripper is conducted by pipe 33 to condenser 34, which discharges into separator 35. The condensed stripping steam is usually cooled in the condenser to a temperature of about 140–180° F.,—this temperature depending somewhat upon the nature of the oil which is undergoing extraction. If a viscous heavy oil is employed, the condensed steam should be relatively hot, while if a low viscosity oil is extracted, particularly if it is a dewaxed oil, the temperature may be as low as ordinary room temperature. In the present case the temperature of condensed stripping steam is about 160°. The solvent leaves separator 35 through pipe 36, to storage tank 10. The water from the bottom of the separator is forced by pump 38 through pipe 39 to mixer 40, wherein it is intimately mixed with oil of about the same temperature from storage tank 41, pump 42 and pipe 43. The intimate mixture of oil and condensed stripping steam is introduced into an intermediate point of separator tank 44, which is large enough to allow sufficient time for the separation of phases,—the oil being continuously withdrawn through pipe 45 and the water being withdrawn through pipe 46 and introduced by means of a pump, if necessary, into mixer 47 wherein it is admixed with further amounts of oil from pipes 43 and 48. The mixture of extracted water and fresh oil is introduced from mixer 47 to settling tank 49, and again the phases are allowed to separate, the oil being discharged through pipe 50 and the water through pipe 51. Finally, this water is mixed in mixer 52 with oil from pipes 43 and 53, and the phases are allowed to separate in separator 54, oil being withdrawn through pipe 55 and waste water being withdrawn through pipe 56.

Pipes 45, 50 and 55 each discharge into oil collector 57. Optionally, I may operate the solvent recovery process in stage countercurrent fashion by closing valves 48a and 43a, blocking lines 50 and 55, and opening lines 50a and 55a.

The oil from the base of this collector 57 is forced through pipe 58, valve 59 and pipe 60 by pump 14, which forces it into mixer 13 as hereinabove described. If all of the oil to be treated is not used for removing solvent from condensed stripping steam, I may supplement the oil from collector 57 by oil from storage tank 41, such oil being introduced through pipe 61 in amounts regulated by valve 62.

In the embodiment hereinabove described, all of the condensed stripping steam was contacted with incoming oil for the removal of dissolved solvent therefrom. In the modification of Figure 2 I have shown means for effecting the concentration of solvent in condensed steam so that the amount of water which must be contacted with oil is materially reduced. In this modification the condensed stripping steam from separator 35 is forced by pump 63 through line 64 to steam still 65. This still may be an ordinary direct fired shell still and the solvent may be removed by distillation. I prefer to inject steam through pipe 66, but in any event the removal of the solvent is chiefly by steam distillation, the solvent going over with the first vapors, being condensed in condenser 67 and introduced to separator 35'. This separator corresponds to separator 35 in Figure 1 in that solvent vapors may be passed through pipe 36' directly to condenser 37, and the condensed steam may be forced through pump 38 in pipe 39 to mixer 40 as hereinabove described. A large amount of the solvent may be recovered through pipe 36' by the steam distillation alone, but for maximum yields I prefer to employ the oil extraction process in combination therewith. In the modification shown in Figure 2, practically all of the solvent may be steam distilled out of the water with about 10–20% of the distilled water so that 89–90% of the water may be discarded from still 65 through pipe 68.

Instead of using a plurality of separators or settlers 44, 49 and 54, I may employ centrifuges for the separation of the oil and water phases in one or all of these steps. Also, instead of using a three-stage extraction process for removing the solvent from the water I may contact the water with the oil countercurrently in a single vertical tower or in a horizontal countercurrent extractor provided with suitable agitating means. The mechanical means by which the phases are separated forms no part of the present invention, and any suitable means may be used to accomplish this purpose.

As hereinabove described, the temperature of the condensed steam and the oil with which it is admixed is preferably about 140–180° F. If a light, non-waxy oil is used, this temperature may be much lower; in fact, it may be at about room temperature but the highest efficiency is obtained at a temperature of complete miscibility of oil and solvent, and therefore I prefer to operate at about 140–160 or 140–180° F.

When one volume of oil is contacted with ten volumes of condensed stripping steam I may remove from 50–65% of the dichlorethyl ether therefrom. When the ratio of oil to water is about 1:1, about 90% of ether is removed, and when the ratio of oil to water is 3:1, about 97% may be removed. If I go to the other extreme and use only one volume of oil to twenty parts of water, only about 35% of the solvent will be removed. The particular percentages, of course, will vary with the different oil stocks which are contacted with the condensed stripping steam, and they will also vary markedly with different solvents, all of the above figures being for dichlorethyl ether. It appears that the percentage removal of the dichlorethyl ether is independent of the actual concentration. Therefore, a large number of extractions with small quantities of oil will be more efficient than a fewer number of extractions with large quantities of oil. If only 80% of ether is extracted in each dump and there are three dumps, it will be seen that more than 99% will be recovered, all of which would be otherwise lost.

While I have described in detail a preferred embodiment of my invention, it should be understood that I do not limit myself to the details or operating conditions hereinabove set forth except as defined by the following claims, which should be construed as broadly as the prior art will permit. Instead of using a pipe still and stripping and fractionating columns, I may employ simple shell stills with perforated steam coils in the bottom thereof for recovering the solvent from the raffinate fractions. The solvent from the extraction fraction is recovered in exactly the same way as the solvent from the raffinate fraction is recovered, and in the system described in Figure 1 it will only be necessary to close valve 25 and open valve 24 when it is desired to remove the solvent from the extract. Also, two stripping towers similar to tower 30 may be employed to permit continuous operation and simultaneous stripping of raffinate and extract, the solvent vapors being combined and treated as hereinbefore described. Many modifications and equivalents will be apparent to those skilled in the art, and are understood to be covered by the following claims.

I claim:

1. In a process for separating a petroleum oil into a plurality of components by the selective solvent action of beta beta dichlorethyl ether wherein the oil is intimately mixed with said ether, and the dichlorethyl ether phase is separated from the oil phase, the method of removing the dichlorethyl ether from one of said phases, which comprises heating said phase to a temperature of about 300–325° F., stripping said heated phase with steam for removing practically all of the dichlorethyl ether therefrom, condensing said steam, mixing said steam with oil which is to be extracted, and separating final waste water from oil which has absorbed the dichlorethyl ether from the water.

2. The method of claim 1 wherein the absorption of dichlorethyl ether from the condensed stripping steam is effected at a temperature of about 140–180° F.

3. The method of claim 1 wherein the condensed stripping steam is steam distilled, the dichlorethyl ether is concentrated in the distillate, and the distillate is contacted with oil to be treated whereby the dichlorethyl ether is absorbed therein and removed from the condensed stripping steam.

4. The method of claim 1 wherein the oil to be treated is contacted with condensed stripping steam containing dissolved dichlorethyl ether in a plurality of stages.

5. In a process for separating components of hydrocarbon oils by means of a selective water soluble solvent, wherein the oil is intimately mixed with said solvent and separated into raffinate and extract phases, the method of recovering solvent from one of said phases which comprises distilling solvent therefrom with steam, condensing said steam and recovering said solvent dissolved in said condensed steam by extraction with further amounts of oil which is to be separated into component parts by means of said solvent.

6. In an oil refining process wherein an oil is intimately mixed with a water soluble solvent and then separated into extract and raffinate phases, each containing amounts of said solvent, the method of removing said solvents from one of said phases which comprises heating said phase to cause the vaporization of a part of said solvent from the oil, stripping said heated phase with steam for removing the rest of the solvent from said phase, condensing said stripping steam and recovering said solvent dissolved in said condensed steam by absorption in further amounts of incoming oil to be treated by said solvent.

7. The method of claim 6 wherein the absorption in the incoming oil is in a plurality of separate absorption steps.

8. In apparatus of the class described, means for extracting oil with dichlorethyl ether and for separating a raffinate phase from an extract phase, means for steam distilling dichlorethyl ether from each phase, means for condensing ether from each phase, means for condensing said stripping steam, and means for contacting said condensed stripping steam with oil to be extracted, whereby said oil absorbs the dichlorethyl ether from the condensed stripping steam.

STERLING H. DIGGS.